Jan. 19, 1926.
J. A. MEBANE
1,569,995
AXLE BRACE AND POSITIONER
Filed Jan. 22, 1925
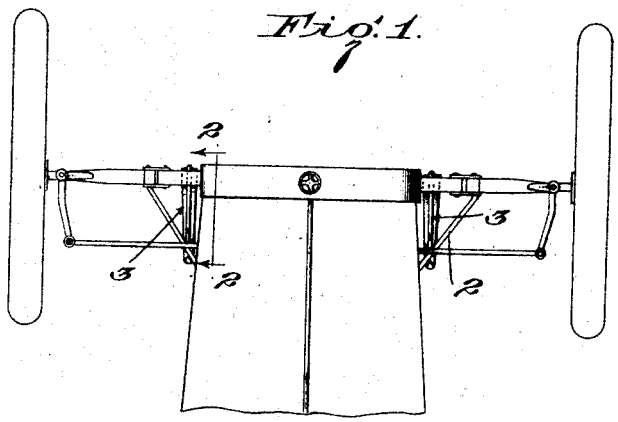
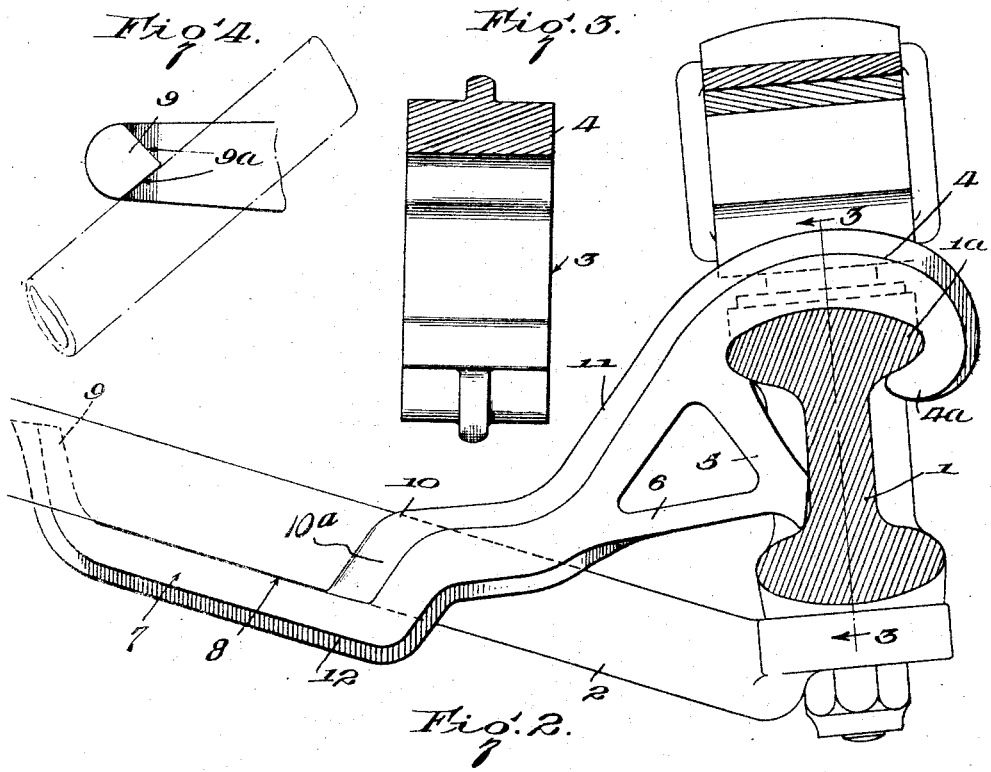
WITNESSES
M. Fowler
INVENTOR
J. A. Mebane
BY
ATTORNEYS Patented Jan. 19, 1926.

1,569,995

UNITED STATES PATENT OFFICE.

JAMES A. MEBANE, OF SOUTH BOSTON, VIRGINIA.

AXLE BRACE AND POSITIONER.

Application filed January 22, 1925. Serial No. 4,130.

*To all whom it may concern:*

Be it known that I, JAMES A. MEBANE, a citizen of the United States, residing at South Boston, in the county of Halifax, State of Virginia, have invented certain new and useful Improvements in Axle Braces and Positioners, of which the following is a specification.

The present invention aims to provide a device for use in bracing and properly positioning the front axle of a "Ford" automobile.

One of the principal objects of the invention resides in the provision of a device of this character which is designed to engage the front axle and the radius rods in such manner as to hold the axle in proper position, the front axle being properly angled, without the use of threaded parts, of bolts or nuts, or of clamps or other devices liable to become loose or worn in the course of time.

A further object is the provision of a brace and positioner of this character which may be constructed of a single piece of metal and which may be assembled with the axle and radius rods without the use of special tools or of laborious effort but which when once assembled cannot become accidentally disengaged but is held permanently to the axle and radius rods.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a fragmentary plan view showing a "Ford" automobile equipped with a set of devices embodying the present invention, Figure 2 is a fragmentary view in vertical section taken in the plane of line 2—2 of Figure 1, Figure 3 is a view in section on line 3—3 of Figure 2, the axle being omitted, and Figure 4 is a fragmentary view in plan showing the shoulders of the brace member for preventing lateral displacement thereof.

Referring to the drawings the numeral 1 designates the front axle of a "Ford" automobile and the numeral 2 designates the radius rods which are connected with the front axle in the usual manner. It is necessary to maintain the front axle of a "Ford" automobile angled as illustrated in Figure 2 to properly operate the vehicle and if the position of the front axle is disturbed and is no longer angled as shown the operation of the vehicle becomes extremely dangerous.

The present invention proposes the use of a pair of axle braces and positioners, designated generally at 3, there being one brace and positioner for each radius rod and of course two for each front axle.

Each brace and positioner 3 comprises a brace member constructed of a single piece of metal and having at its forward end means adapted to engage with the front axle for securing the brace member thereto and comprising a hooked jaw 4 designed and shaped to snugly engage the top of the axle 1, the bill $4^a$ of the hooked jaw engaging under the upper forward flange $1^a$ of the axle. This means also includes a forwardly and downwardly directed bar 5 engageable with the rear of the front axle as shown in Figure 2. The bar 5 is reinforced and strengthened by a brace element 6.

Each brace member also includes a rearwardly extending arm, designated generally at 7, which has a flat face 8 adapted to engage a radius rod, the arm 7 being extended under a radius rod. Each arm 7 has a pair of upwardly extending projections, designated at 9 and 10, the projections 9 and 10 having angular faces $9^a$ and $10^a$ engageable with the radius rods to prevent lateral displacement of the brace member. By providing each projection with pairs of oppositely angled faces $9^a$ and $10^a$ the brace members are interchangeable, that is, any brace member may be used with either radius rod.

The parts of the brace members are strengthened by ribs 11 and 12.

The brace members are constructed of metal having some degree of resiliency. The hook shaped jaw 4 and the bar 5 are so heavily constructed and so designed as to be rigid and unyielding but the arm 7 has sufficient resiliency to enable it to be flexed to some extent since this arm 7 is not so heavy as the jaw 4 and bar 5, the brace member being tapered from the end at which the jaw 4 occurs to the end at which the projection 9 occurs.

In assembling the devices with the axle and radius rods each device is first engaged with the axle and then shifted along the axle until the arm 7 is snapped under the radius rod with which it is associated. Both the arm 7 and the radius rod flex or give to some extent during the assembling operation and after the parts have been assembled the arm 7 is still flexed slightly and this tends to hold the parts in assembly and prevents accidental displacement.

With the device described the axle is held and braced in proper position and the use of threaded parts such as bolts and nuts or clamps or the like is avoided. At the same time a permanent assembly is had.

I claim:

1. In a device of the character described, a brace member having means adapted to engage with the front axle of an automobile to secure the brace member thereto, said brace member having an arm adapted to engage under a radius rod of the automobile, said arm having shoulders adapted to engage the radius rod to prevent lateral displacement of the brace member, the arm being held engaged with the radius rod solely by virtue of its disposition under the rod and by virtue of the action of the shoulders.

2. In a device of the character described, a brace member having a hooked jaw adapted to engage over the top and under the upper forward flange of a front axle of an automobile, said brace member having a forwardly and downwardly directed bar adapted to engage the rear of said axle, said brace member having an arm having a portion adapted to engage under a radius rod of an automobile, the brace member being constructed of metal of such a character that the arm will have some degree of resiliency, the arm being slightly flexed in assembly, whereby the inherent resiliency of the brace member is brought into play to aid in holding it in position.

3. In a device of the character described, a brace member having a hooked jaw adapted to engage over the top and under the upper forward flange of a front axle of an automobile, said brace member having a forwardly and downwardly directed bar adapted to engage the rear of said axle, said brace member having an arm having a portion adapted to engage under a radius rod of an automobile, the brace member being constructed of metal of such a character that the arm will have some degree of resiliency, the arm being slightly flexed in assembly, whereby the inherent resiliency of the brace member is brought into play to aid in holding it in position, the arm having upwardly extending projections presenting shoulders adapted to engage the radius rod to prevent lateral displacement of the brace member.

4. A device for use in bracing and properly positioning the front axle of an automobile of the type having radius rods and comprising two brace members, one between the axle and each radius rod, the brace members being interchangeably usable with either brace rod, each brace member having means adapted to engage with the front axle to secure the brace member thereto, and also having an arm adapted to engage under a radius rod, said arm having upwardly extending projections formed with angular faces adapted to engage the radius rods to prevent angular displacement.

JAMES A. MEBANE.